Aug. 9, 1927.  R. MUELLER ET AL  1,638,545
TRAP
Filed July 24, 1922   2 Sheets-Sheet 1
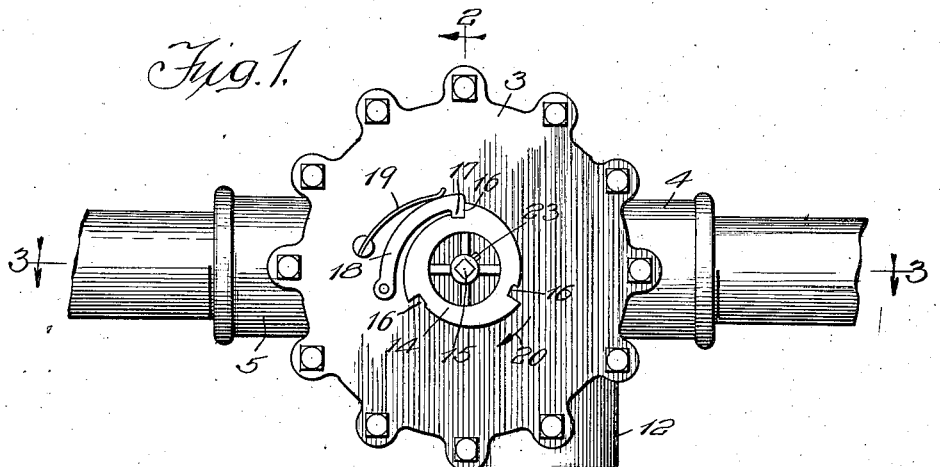
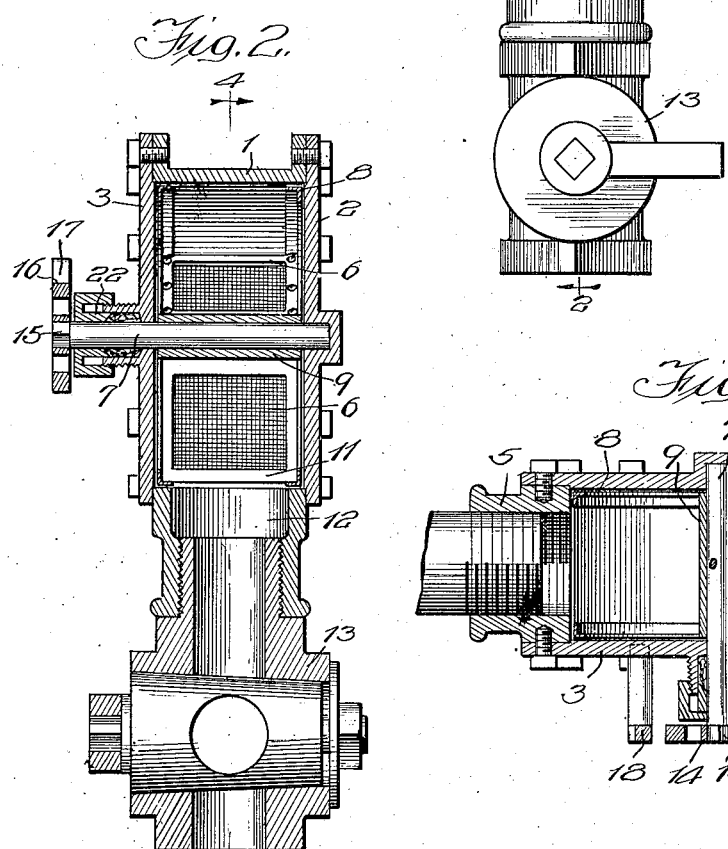
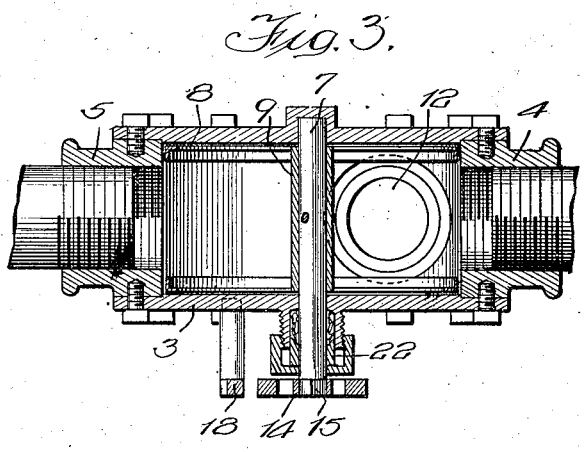
Inventors:
Rudolph Mueller
Otto L. Mueller
By Murray Lotz & Wilson Attys.
Witnesses:
W. F. Kilroy
Harry R. L. White Aug. 9, 1927. 1,638,545
R. MUELLER ET AL
TRAP
Filed July 24, 1922 2 Sheets-Sheet 2

Witnesses:
W. F. Kilroy
Harry R. L. White

Inventors
Rudolph Mueller
Otto L. Mueller
By Murray Lotz & Wilson
Attys.

Patented Aug. 9, 1927.

1,638,545

UNITED STATES PATENT OFFICE.

RUDOLPH MUELLER AND OTTO L. MUELLER, OF CHICAGO, ILLINOIS.

TRAP.

Application filed July 24, 1922. Serial No. 576,932.

Our invention relates to improvements in traps and has special reference to traps for removing materials such as shells, fish, etc., from a water supply.

The object of our invention is to provide a trap which shall effectually catch all solid or semi-solid material being carried by the water; which shall be capable of being emptied or discharged without the necessity of shutting either the inlet or the outlet of the trap; and in which the screen shall divert the solid material and be washed free of other collected material such as fibrous material and scum in the normal operation of the trap, without the necessity of opening the trap for this purpose.

In its preferred form, our invention resides in a suitable closed chamber through which the water passes from an inlet to an outlet, a diverting screen within the chamber through which the water flows and which tends to throw any solid or semi-solid materials down into a lower portion of the trap, the screen being capable of being moved without opening the trap to cause the water to flow through same in a reverse direction and by which the screen is washed free of accumulation thereon.

Our invention will be more readily understood by reference to the accompanying drawings forming part of this specification, and in which:—

Figure 1 is a side elevation of a trap embodying our invention in one form;

Figure 2 is a vertical sectional view on the line 2—2 of Figure 1;

Figure 3 is a horizontal sectional view on the line 3—3 of Figure 1;

Figure 4:
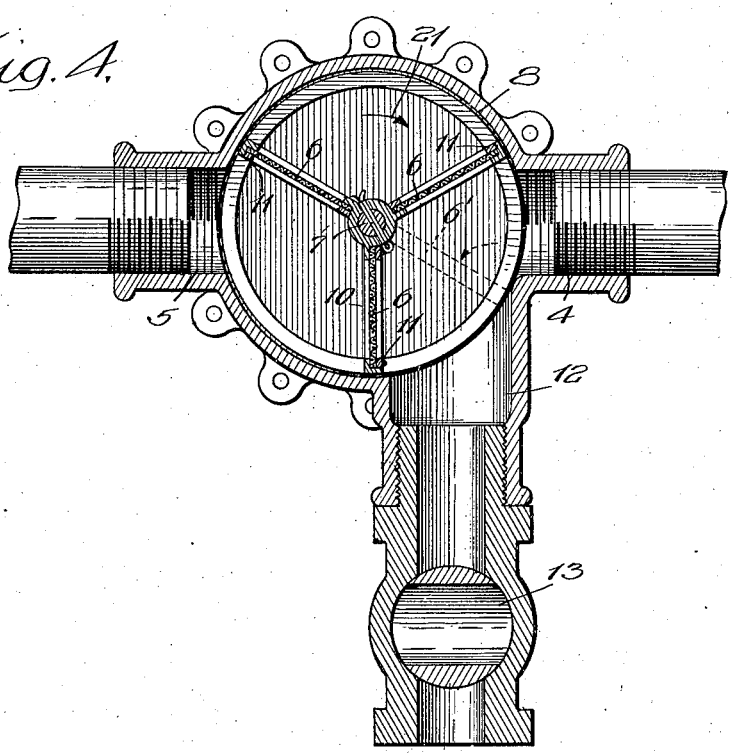
Figure 4 is a vertical central sectional view on the line 4—4 of Figure 2.

As shown in the drawings our trap comprises a cylindrical casing 1 closed at one side by a head 2 and at the other side by a head 3. The casing is provided with an inlet 4 at one end of the horizontal diameter of the casing and with an outlet 5 at the other end. Within the casing we arrange a rotatable screen interposed between the inlet and the outlet.

The preferred form of screen consists of a plurality of radially extending screens 6. In the form shown in Figure 4, there are three of these screens 6 equally spaced around an axial shaft 7. The screens are mounted in a framework consisting of rings 8 substantially equal in diameter to the casing and arranged one at each side thereof. These rings are connected to a hub 9 by arms 10. Mounted on this frame work are individual frames 11 for the screens 6.

The screens extend substantially across the casing and from the hub to the periphery thereof. Below the inlet 4, we arrange a pocket 12 into which any solid or semi-solid material carried by the water entering the inlet 4 will be deflected by the screens 6. At the lower end of the pocket we provide an outlet closed by a valve 13 by which the contents of the pocket can be discharged.

We provide means for holding the screens in the preferred positions as shown in Figure 4 with one of the screens 6 in inclined position above the inlet 4 and another of the screens in vertical position just beyond the pocket 12. The means for holding the screens in this position consists of a cam member 14 rigidly mounted on the outer end 15 of the shaft 7 and provided with notches 16 in its periphery and adapted to receive a tooth 17 on a pivoted dog 18, the dog being adapted to be held in engagement with the cam by a spring 19. The notches 16 and the cam 14 are arranged to hold the screen member in the position shown in Figure 4 and the screen member is adapted to be rotated from one position to the next in the direction of the arrow 20 shown on Figure 1 and 21 shown on Figure 4. The outer periphery of the cam between the notches is eccentric so that the screen can be turned readily by slightly lifting the dog 18 to free its tooth from engaged position and then as the cam is turned, the spring will cause the tooth to enter the next notch as soon as it is reached.

At 6' in Figure 4, we have shown one of the screens in dotted lines in an intermediate position and in such position when the valve 13 is open for discharging the contents of the catch chamber 12, the water will flow through the screen in a reverse direction to that in which it was flowing through the screen in inclined position above the inlet. Consequently any material which has lodged against the screen such as fibers or scum will be washed off and discharged through the valve 13 and when the screen reaches its normal vertical position just beyond the chamber 12, it will have been cleared of such strained out material. The vertical screen shown in Figure 4 is washed free of fibrous matter in a very simple manner by a reverse flow of the water. This is accomplished in practice by shutting off the supply of water and then opening the discharge valve 13, whereupon the water contained in the system supplied through this trap will flow back through the trap and be discharged through the discharge valve 13. This method of washing, as will be seen, applies also to the form of trap shown in Figure 5.

It should be noted that the outlet of the trap is always protected by the screen except possibly for a short period of time during the rotation of the screen from one position to the next, but as this changing of the screens can be accomplished almost instantly, substantially no unstrained water can escape through the outlet. It is to be noted, however, that in practice no unscreened water would flow through the trap for the reason that during the shifting of the screen the discharge valve should be open and consequently at such time no water would be flowing to the outlet 5.

In assembling the device, the screen can be placed on the inner end of the shaft 7 and a cotter pin 7′ being used to cause the screen member to rotate with the shaft, and it can then be entered into the casing and after that, the heads 2 and 3 can be secured on the sides of the casing.

The shaft 7 projects through a suitable central opening in the head 3 and we provide a stuffer 22 of usual construction to prevent the escape of water at this point. The outer end 15 of the shaft 7 is preferably squared to receive the cam 14 and a suitable set screw 23 may be provided to prevent the cam coming off of the shaft.

Figure 5:
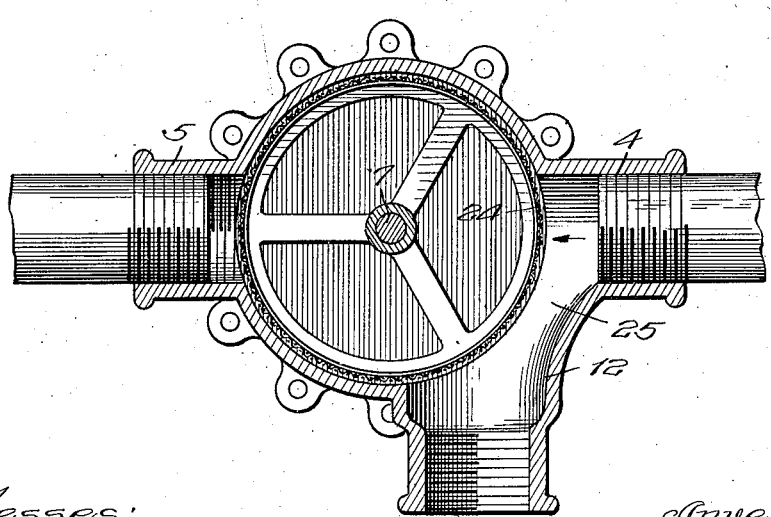
Figure 5 is a view similar to Figure 4 showing a modified form of our invention.

In the form of device shown in Figure 5, the casing is substantially the same as that shown in Figure 4. In this form, however, instead of the three radial screens provided in the form shown in Figure 4 we provide a cylindrical barrel-like screen 24 mounted upon a suitable framework, the screen 24 fitting within the cylindrical casing and mounted upon a central shaft as in the other form. In order to provide a passage of sufficient size to permit the solid or semi-solid material to fall down freely, we widen the catch chamber as shown at 25. It will be readily understood that the cylindrical screen 24 can be rotated to various positions to place different portions of its periphery in the path of the incoming water. The collecting chamber 12 is arranged beneath the inlet side of the trap so that the portion of the cylindrical screen exposed, extends in a downwardly inclined relation to the direction of the flow of the incoming water, thus being arranged in the best position for causing any solid or semi-solid material carried by the water to be thrown down into the catch chamber. It will be understood that we contemplate arranging suitable valves controlling the inlet and the outlet so that when the discharge valve is opened, the water can be made to flow through the discharge either back from the outlet or direct from the inlet as might be desired in cleansing the screen. For instance, if the supply were to be shut off and the drain valve opened the water would flow back from the outlet through the trap and thus cause a reverse flow through the portion of the screen which has just been in use and thereby free it from fibrous and other material which might tend to clog the screen.

In like manner, the lower vertical screens 6 in the form of trap shown in Figure 4 can be cleansed before the screen as a whole is rotated to a new position.

As many modifications of our invention will readily suggest themselves to one skilled in the art, we do not limit or confine our invention to the specific details of construction or operation herein shown and described.

We claim:

In a trap of the kind described, a cylindrical chamber, an inlet therefor and an outlet arranged in the cylindrical wall and oppositely disposed, an axial shaft in the chamber a plurality of radially arranged screens on the shaft, each extending from the shaft to the cylindrical wall, means for retaining the shaft against rotation in predetermined positions, a space at the lower part of the trap for receiving screened out material, a discharge valve for said space, one of said screens being adapted to be arranged in inclined relation to the direction of flow of water through the trap for deflecting solid and semi-solid materials into said space, the next successive screen below the inclined screen being substantially vertically disposed, the movement of the inclined screen downwardly to vertical position causing a reversed flow of the liquid through the screen as and for the purpose specified.

Signed at Chicago, Illinois, this 18th day of January, 1922.

RUDOLPH MUELLER.
OTTO L. MUELLER.